United States Patent  (10) Patent No.: US 11,268,814 B2
Nakamura et al.  (45) Date of Patent: Mar. 8, 2022

(54) MOVEMENT INFORMATION CALCULATING DEVICE, MOVEMENT INFORMATION CALCULATING METHOD AND MOVEMENT INFORMATION CALCULATING PROGRAM

(71) Applicant: Furuno Electric Co., Ltd., Nishinomiya (JP)

(72) Inventors: Hiraku Nakamura, Osaka (JP); Hiroyuki Toda, Nishinomiya (JP); Naomi Fujisawa, Nishinomiya (JP); Akihiro Hino, Kakogawa (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 3 days.

(21) Appl. No.: 16/889,034

(22) Filed: Jun. 1, 2020

(65) Prior Publication Data

US 2020/0292316 A1  Sep. 17, 2020

Related U.S. Application Data

(63) Continuation-in-part of application No. PCT/JP2018/042754, filed on Nov. 20, 2018.

(30) Foreign Application Priority Data

Dec. 1, 2017  (JP) .............................. JP2017-231709

(51) Int. Cl.
*G01M 1/12* (2006.01)
*G05D 1/02* (2020.01)
*G01C 21/18* (2006.01)

(52) U.S. Cl.
CPC ............. *G01C 21/18* (2013.01); *G01M 1/122* (2013.01); *G05D 1/0206* (2013.01)

(58) Field of Classification Search
CPC ...... G01C 21/18; G01C 21/10; G01C 21/203; G05D 1/0206; G08G 3/02; B63B 49/00; G01M 1/122
See application file for complete search history.

(56) References Cited

U.S. PATENT DOCUMENTS 5,754,429 A  5/1998 Ishihara et al.
7,366,593 B2  4/2008 Fujimoto et al.
(Continued)

FOREIGN PATENT DOCUMENTS

JP  08119197 A  *  5/1996
JP  2002048592 A  *  2/2002
(Continued)

OTHER PUBLICATIONS

English translation of JP-2002048592-A.*
(Continued)

*Primary Examiner* — Anshul Sood
(74) *Attorney, Agent, or Firm* — Xsensus LLP

(57) ABSTRACT

A movement information calculating device includes a positioning sensor, a velocity sensor, an attitude sensor and processing circuitry. The positioning sensor is configured to calculate a position of the positioning sensor on a movable body. The velocity sensor is configured to calculate a velocity of the movable body. The attitude sensor is configured to calculate an attitude of the movable body. The processing circuitry is configured to calculate a center-of-gravity position and a center-of-gravity velocity of the movable body by using the position, the velocity, and the attitude, and calculate one of a turning center position and a pivoting position of the movable body by using the center-of-gravity position and the center-of-gravity velocity.

7 Claims, 6 Drawing Sheets

(56) References Cited

U.S. PATENT DOCUMENTS

2009/0143926 A1 6/2009 Almalki et al.
2013/0317741 A1* 11/2013 Brashear .............. G01C 21/165
                                                          701/472

FOREIGN PATENT DOCUMENTS

| JP | 2004-042884 A | 2/2004 |
| JP | 2004-318380 A | 11/2004 |
| JP | 2006-044316 A | 2/2006 |
| WO | 93/07448 A1 | 4/1993 |

OTHER PUBLICATIONS

English translation of JP-08119197-A.*
International Search Report and Written Opinion dated Feb. 19, 2019 for PCT/JP2018/042754 filed on Nov. 20, 2018, 9 pages including English Translation of the International Search Report.
Yazan Mohammad Al-Rawashdeh et al., "In-Flight Estimation of Center of Gravity Position Using All-Accelerometers", Sensors, vol. 14, No. 9, Jan. 1, 2014, pp. 17567-17585, XP055841872, soi:10.3390/s140917567, Retrieved from the Internet: URL:https://www.ncbi.nlm.nih.gov/pmc/articles/PMC4208239/pdf/sensors-14-17567.pdf.
Extended European Search Report dated Oct. 15, 2021, in corresponding European Patent Application No. 18883868.4.

* cited by examiner

MOVEMENT INFORMATION CALCULATING DEVICE, MOVEMENT INFORMATION CALCULATING METHOD AND MOVEMENT INFORMATION CALCULATING PROGRAM

CROSS-REFERENCE TO RELATED APPLICATION(S)

This application is a continuation-in-part of PCT International Application No. PCT/JP2018/042754, which was filed on Nov. 20, 2018, and which claims priority to Japanese Patent Application Ser. No. 2017-231709, filed on Dec. 1, 2017, the entire disclosures of each of which are herein incorporated by reference for all purposes.

TECHNICAL FIELD

The present disclosure relates to a movement information calculating device, a movement information calculating method, and a movement information calculating program which calculate movement information of a movable body such as a ship, particularly, information related to turning of the movable body.

BACKGROUND

Conventionally, various technologies for preventing a collision of a movable body such as a ship are put into practical use. Among these, various devices which estimate a path of the movable body and display the estimated path, are put into practical use.

For example, a display apparatus of Patent Document 1 measures a velocity, a direction, and a turning angular velocity of a movable body so as to calculate a movement track in the past and an estimated track in the future. The display apparatus of Patent Document 1 displays both of the movement path in the past and the estimated path in the future.

REFERENCE DOCUMENT OF CONVENTIONAL ART

Patent Document

[Patent Document 1] WO 993/007448A1

However, the information acquired by the devices contrived in the past, such as the display apparatus disclosed in Patent Document 1, may be insufficient as estimation data during turning. Therefore, further data indicating a state of the movable body during turning is demanded.

Therefore, a purpose of the present disclosure is to further fulfill data which indicates a state of a movable body during turning.

SUMMARY

A movement information calculating device according to the present disclosure includes a positioning sensor, a velocity sensor, an attitude sensor and processing circuitry. The positioning sensor is configured to calculate a position of the positioning sensor on a movable body. The velocity sensor is configured to calculate a velocity of the movable body. The attitude sensor is configured to calculate an attitude of the movable body. The processing circuitry is configured to calculate a center-of-gravity position and a center-of-gravity velocity of the movable body by using the position, the velocity, and the attitude, and calculate one of a turning center position and a pivoting position of the movable body by using the center-of-gravity position and the center-of-gravity velocity.

According to this configuration, the turning center position or the pivoting position which indicates the state of the movable body during turning can be calculated by using the position, the velocity, and the attitude of the movable body.

According to the present disclosure, data which indicates the state of the movable body during turning can further be fulfilled.

DETAILED DESCRIPTION

Figure 1:
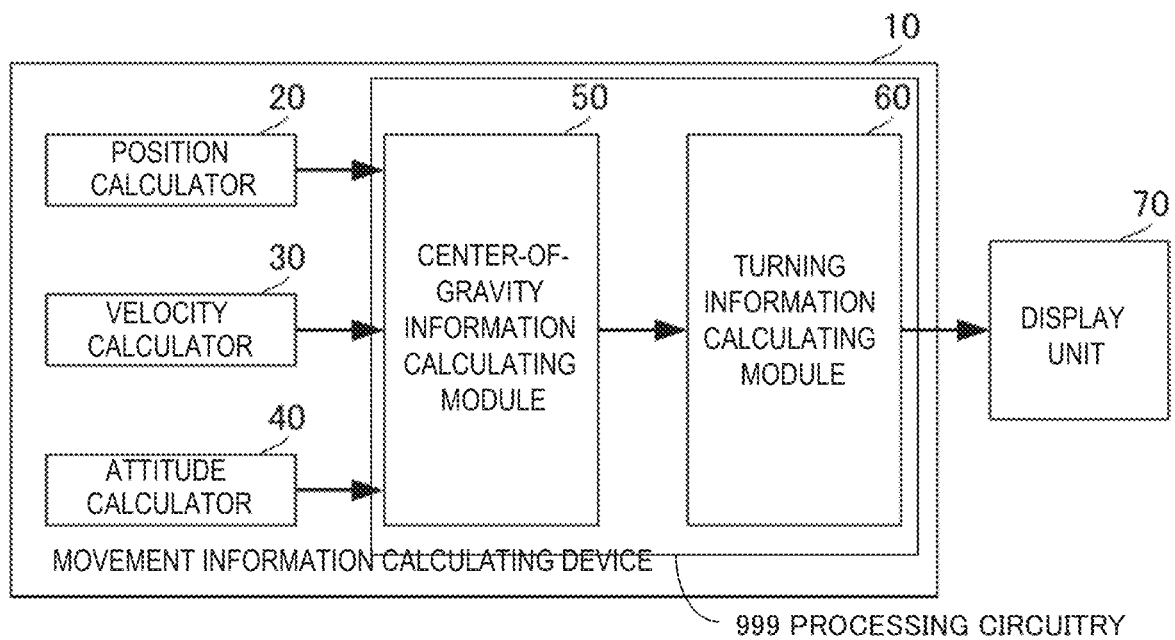
FIG. 1 is a functional block diagram of a movement information calculating device according to Embodiment 1 of the present disclosure.
Figure 2:
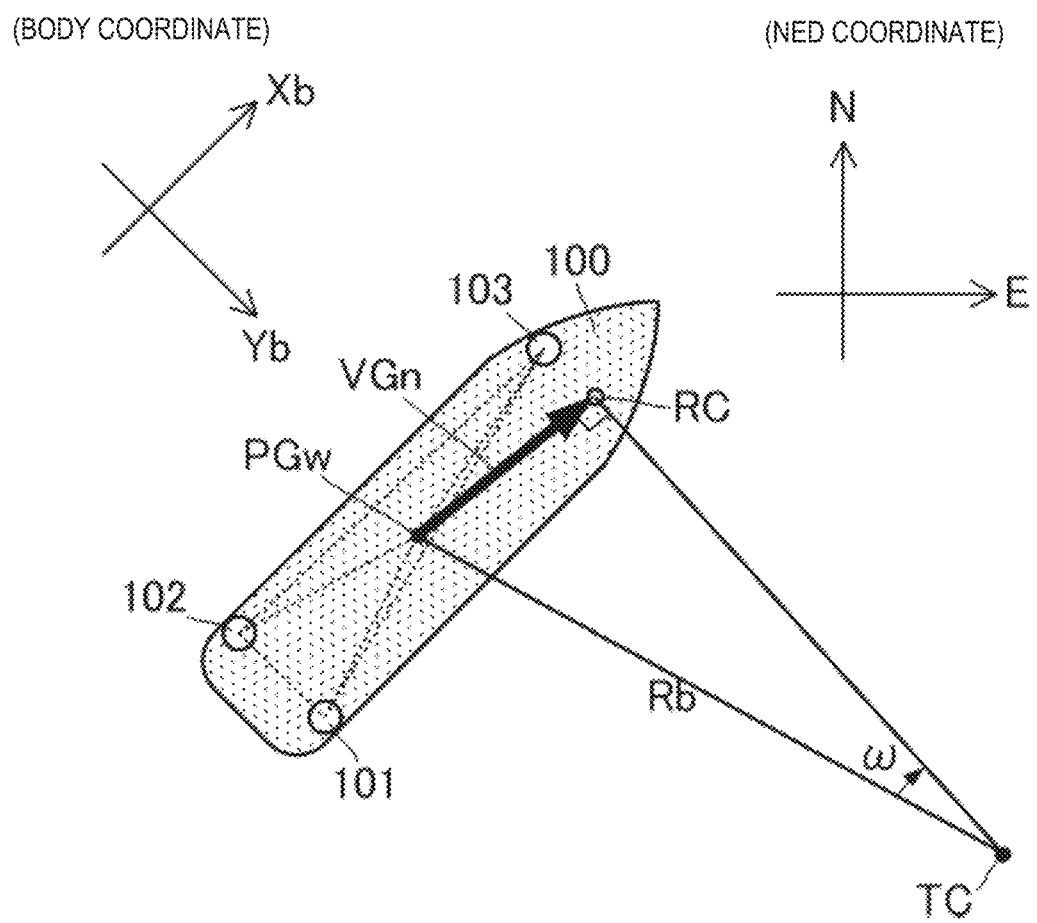
FIG. 2 is a plan view illustrating a turning state of a ship.

A movement information calculating device, a movement state calculating method, and a movement state calculating program according to Embodiment 1 of the present disclosure are described with reference to the drawings. FIG. 1 is a functional block diagram of the movement information calculating device according to Embodiment 1 of the present disclosure. FIG. 2 is a plan view illustrating a turning state of a ship. Note that, although a ship is used as a movable body in this embodiment, various moving bodies, such as another water-surface movable body, an underwater movable body, and an aerial movable body are applicable. Configurations of the present disclosure are especially effective for a movable body with a large body such as a hull and a fuselage.

As illustrated in FIG. 1, the movement information calculating device may include a position calculator 20 (which is also referred to as a positioning sensor), a velocity calculator 30 (which is also referred to as a velocity sensor), an attitude calculator 40 (which is also referred to as an attitude sensor), a center-of-gravity information calculating module 50, and a turning information calculating module 60. For example, the position calculator 20 may be implemented by a positioning sensor, the velocity calculator 30 may be implemented by a velocity sensor, and the attitude calculator 40 may be implemented by an attitude sensor. The center-of-gravity information calculating module 50 and the turning information calculating module 60 may be implemented by, for example, a storage device which stores a program for executing these functions, and computing elements (e.g., a CPU) which execute the program stored in the storage device. The center-of-gravity information calculating module 50 and the turning information calculating module 60 may also be referred collectively to as processing circuitry 999. The positioning sensor corresponds to the "position calculator," the velocity sensor corresponds to the "velocity calculator," and the attitude sensor corresponds to the "attitude calculator" of the present disclosure.

The movement information calculating device 10 may be connected to a display unit 70. Note that this display unit 70 may be included in the movement information calculating device 10.

The movement information calculating device 10 and the display unit 70 may be equipped in a hull 100 as illustrated in FIG. 2. The hull 100 may be provided with compound sensors 101, 102, and 103.

As illustrated in FIG. 2, the compound sensors 101 and 102 may be disposed around the stern of the hull 100. The compound sensors 101 and 102 may be disposed at different positions from each other in a Yb-direction in a Body coordinate system (a movable body coordinate system).

As illustrated in FIG. 2, the compound sensor 103 may be disposed around the bow of the hull 100. In other words, the compound sensor 103 may be disposed at a different position from the compound sensors 101 and 102 in a direction connecting the bow and the stern of the hull 100, that is, in an Xb-direction in the Body coordinate system. Note that the arrangement of the compound sensors 101, 102, and 103 is not limited to this, and the number of compound sensors provided to the hull 100 is also not limited to this.

The compound sensors 101, 102, and 103 may each include an antenna that receives positioning signals, a positioning calculator which calculates a position by using positioning signals of a GNSS (Global Navigation Satellite System), a velocity sensor which measures a ship ground speed, and a gyrocompass. Accordingly, the compound sensors 101, 102, and 103 may each include the positioning sensor (one example of the position calculator 20), the velocity sensor (one example of the velocity calculator 30), and the attitude sensor (one example of the attitude calculator 40).

According to this configuration, each of the positioning sensors of the compound sensors 101, 102, and 103 may use the positioning signals from positioning satellites to measure a position Pw of the corresponding compound sensor. By the positioning signals being used, the position Pw may be indicated in the geodetic coordinate system. The geodetic coordinate system may be, for example, the WGS84 in which the center of the earth is the origin, a direction connecting the North Pole and the South Pole is a Zw-direction, a direction perpendicular to the reference meridian is an Xw-direction, and a direction perpendicular to the Zw-direction and the Xw-direction is a Yw-direction. Each positioning sensor may output the position Pw to the center-of-gravity information calculating module 50.

Moreover, each of the velocity sensors of the compound sensors 101, 102, and 103 may measure a ship ground speed COG which is a velocity Vn of corresponding compound sensor, in a known method. The velocity Vn may be indicated in the north-east-down (NED) coordinate system. In the NED coordinate system, when seen from the current location on the earth, the North direction may be an N-direction, the East direction may be an E-direction, and the vertically down direction may be a D-direction. Each velocity sensor may output the velocity Vn to the center-of-gravity information calculating module 50.

Moreover, each of the attitude sensors of the compound sensors 101, 102, and 103 may measure an attitude AA of corresponding compound sensor so as to measure an angular velocity ωb which is an amount of temporal change in the attitude angle AA. The angular velocity ωb may be indicated in the Body coordinate system (movable body coordinate system). As described above, in the Body coordinate system of the hull 100, a direction connecting the bow and the stern may be the Xb-direction, a direction connecting the starboard and the port may be the Yb-direction, and a direction perpendicular to the Xb-direction and the Yb-direction may be a Zb-direction. Each attitude sensor may output the angular velocity ωb to the center-of-gravity information calculating module 50.

The center-of-gravity information calculating module 50 may calculate, using the positions Pw, the velocities Vn, and the angular velocities ωb, a center-of-gravity position PGw and a center-of-gravity velocity VGn of the hull 100. In detail, the center-of-gravity information calculating module 50 may use the following method to calculate the center-of-gravity position PGw and the center-of-gravity velocity VGn.

The center-of-gravity information calculating module 50 may calculate the center-of-gravity position PGw based on the positions Pw of the compound sensors 101, 102, and 103. Moreover, the center-of-gravity information calculating module 50 may calculate a center-of-gravity velocity PVn based on the velocities Vn of the compound sensors 101, 102, and 103. A positional relationship in the movable body coordinate system between the positions of the compound sensors 101, 102, and 103, and the center-of-gravity position is known in advance, for example, by a measurement. Therefore, by using this positional relationship, the center-of-gravity position PGw and the center-of-gravity velocity VGn can be calculated.

The center-of-gravity information calculating module 50 may output the center-of-gravity position PGw and the center-of-gravity velocity VGn to the turning information calculating module 60.

The turning information calculating module 60 may calculate a turning radius vector Rb. As illustrated in FIG. 2, the turning radius vector Rb may be a vector starting at a turning center position TC of the hull 100 and ending at the center-of-gravity position PGw of the hull 100.

Based on the positional relationship illustrated in FIG. 2, the turning information calculating module 60 may calculate the turning radius vector Rb using the center-of-gravity velocity VGn, the angular velocity ωb, and the following equation. The turning radius vector Rb may be expressed by three-dimensional components (Rbx, Rby, Rbz) of the movable body coordinate system.

$$VGn = C_b^n \cdot (\omega b \times (-Rb)) \qquad \text{(Equation 1)}$$

Note that the $C_b^n$ may be a transformation matrix from the movable body coordinate system to the NED coordinate system, and can be calculated using the angular velocity ωb in a known method. Moreover, in this Equation 1 and the following equations, "*" may indicate an inner product of the vector, and "×" may indicate an outer product of the vector.

The turning information calculating module 60 may calculate a pivoting position RC and the turning center position TC. As illustrated in FIG. 2, the pivoting position RC may be a position to be an axis of the hull 100 during the turning. For example, when the hull 100 turns from the bow side, the pivoting position RC may be on the bow side of the center-of-gravity position PGw. On the other hand, when the hull 100 turns from the stern side, the pivoting position RC may be on the stern side of the center-of-gravity position PGw. Moreover, the turning center position TC may be a position indicating the center point of the turning motion of the hull 100. The pivoting position RC and the turning center position TC may be indicated in the geodetic coordinate system.

Based on the positional relationship illustrated in FIG. 2, the turning information calculating module 60 may calculate the turning center position TC using the center-of-gravity position PGw, the turning radius vector Rb, and the following equation.

$$TC = PGw + C_n^w \cdot C_b^n \cdot Rb \quad \text{(Equation 2)}$$

Moreover, based on the positional relationship illustrated in FIG. 2, the turning information calculating module 60 may calculate the pivoting position RC using the center-of-gravity position PGw, a one-component turning radius vector Rb1, and the following equation.

$$RC = PGw + C_n^w \cdot C_b^n \cdot Rb1 \quad \text{(Equation 3)}$$

Note that $C_n^w$ may be a transformation matrix from the NED coordinate system to the geodetic coordinate system, and can be calculated based on the position Pw in a known method. Moreover, the one-component turning radius vector Rb1 may be composed of an X-direction component of the turning radius vector Rb, and defined by Rb1=(Rbx, 0, 0).

The turning information calculating module 60 may output to the display unit 70 the turning center position TC and the pivoting position RC calculated in the geodetic coordinate system. The display unit 70 may display the turning center position TC and the pivoting position RC. At this time, the display unit 70 may display other information related to the hull 100 (e.g., the center-of-gravity position PGw) in addition to the turning center position TC and the pivoting position RC.

As described above, the movement information calculating device 10 of this embodiment can calculate the turning center position TC and the pivoting position RC related to the turning motion of the hull 100, based on the position Pw measured by the positioning sensors, the velocity Vn measured by the velocity sensors, and the angular velocity ωb measured by the attitude sensors. That is, the turning center position TC and the pivoting position RC can be calculated in the basic configuration where the position, the velocity, and the attitude of the hull 100 are calculated, without a sensor etc. for measuring the turning center position TC and the pivoting position RC being provided.

According to this configuration, the information required during the turning of the hull 100 may be fulfilled.

Figure 3:
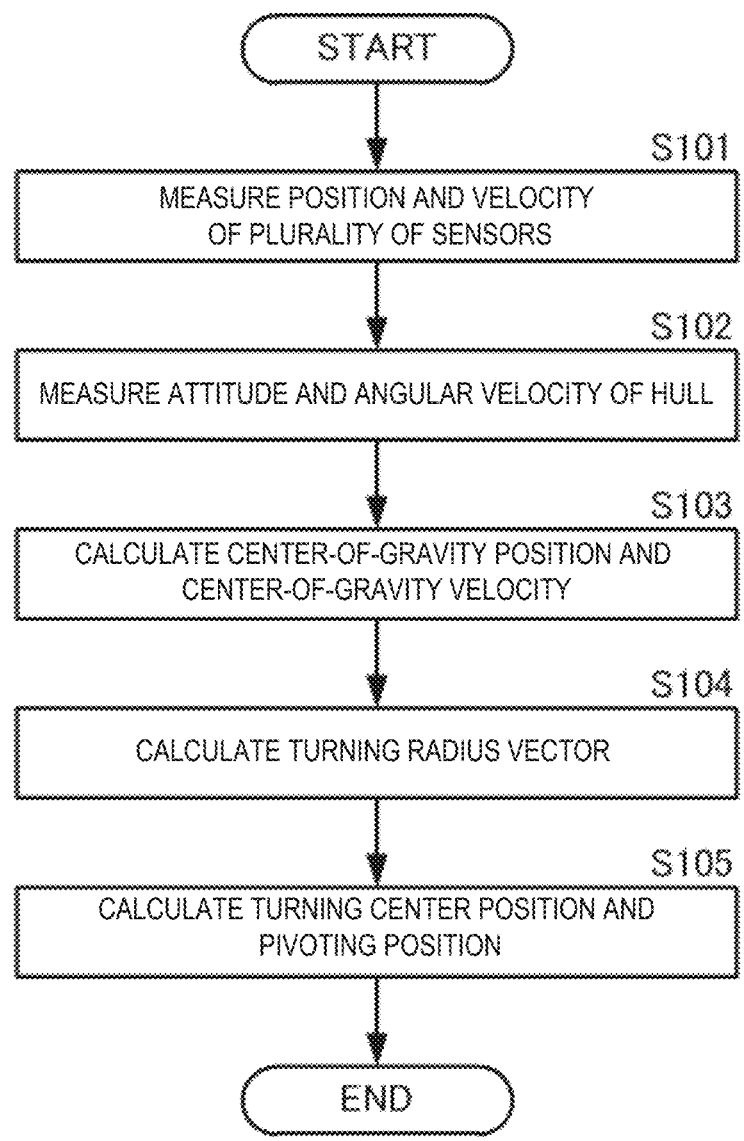
FIG. 3 is a flowchart illustrating a method of calculating movable body information according to Embodiment 1 of the present disclosure.

In the above description, each processing for calculating the turning center position TC and the pivoting position RC may be executed by a separated functional part. However, each processing after the calculation of the center-of-gravity position PGw and the center-of-gravity velocity VGn may be stored in a storing module by being programmed, and implemented by the program being executed by a processing device such as a computer. In this case, the processing device may execute the processing at and after Step S103 of a flowchart illustrated in FIG. 3. FIG. 3 is a flowchart illustrating a method of calculating the movable body information according to Embodiment 1 of the present disclosure. Note that, since the processing of each step is described in detail above, detailed description is omitted below.

First, each of the plurality of compound sensors may measure the position Pw and the velocity Vn of the corresponding sensor (Step S101). Moreover, the plurality of compound sensors may measure the attitude AA and the angular velocity ωb of the hull 100 (Step S102).

The processing device may use the positions Pw, the velocities Vn, and the angular velocities ωb to calculate the center-of-gravity position PGw and the center-of-gravity velocity VGn (Step S103).

The processing device may use the center-of-gravity velocity VGn and the angular velocity ωb to calculate the turning radius vector Rb (Step S104).

The processing device may use the turning radius vector Rb and the center-of-gravity position PGw to calculate the turning center position TC. Moreover, the processing device may use the one-component turning radius vector Rb1 of the turning radius vector Rb, and the center-of-gravity position PGw to calculate the pivoting position RC (Step S105).

Note that, although three compound sensors are used in the above description, one compound sensor may be used. In this case, the center-of-gravity information calculating module 50 may calculate the center-of-gravity position PGw and the center-of-gravity velocity VGn as follows.

The center-of-gravity information calculating module 50 may acquire a vector Db between the center of gravity and the sensor based on a designed shape of the hull, etc. The vector Db between the center of gravity and the sensor may indicate the position of the compound sensor on the basis of the center-of-gravity position PGw. The vector Db between the center of gravity and the sensor may be indicated in the movable body coordinate system.

The center-of-gravity information calculating module 50 may calculate the center-of-gravity position PGw using a position PG measured by the positioning sensor, the vector Db between the center of gravity and the sensor, and the following equation.

$$Pw = PGw + C_n^w \cdot C_b^n \cdot Db \quad \text{(Equation 4)}$$

Moreover, the center-of-gravity information calculating module 50 may calculate the center-of-gravity velocity VGn using the velocity Vn measured by the velocity sensor, the angular velocity ωb measured by the attitude sensor, the vector Db between the center of gravity and the sensor, and the following equation.

$$Vn = VGn + C_b^n \cdot (\omega b \times Db) \quad \text{(Equation 5)}$$

As described above, even if the number of compound sensor is one, that is, the number of each of the positioning sensor, the velocity sensor, and the attitude sensor is one, the center-of-gravity position PGw and the center-of-gravity velocity VGn can be calculated. According to this, the turning center position TC and the pivoting position RC can be calculated.

Moreover, in the above description, the turning center position TC and the pivoting position RC may be calculated in the geodetic coordinate system. However, the turning center position TC and the pivoting position RC may be calculated in the movable body coordinate system. In this case, when setting the center-of-gravity position PGw as a reference point (0, 0, 0), a turning center position TCb may be calculated based on the following equation.

$$TCb = Rb \quad \text{(Equation 6)}$$

Moreover, the pivoting position RC may be calculated based on the following equation.

$$RC = Rb1 \quad \text{(Equation 7)}$$

As described above, the turning center position TC and the pivoting position RC can be calculated also in the movable body coordinate system.

Note that, in the above description, the turning center position TC and the pivoting position RC can be calculated for not only one time point, but also for a plurality of time points in the future. For example, the calculated pivoting position RC may be set as a new center-of-gravity position PGw so as to calculate a pivoting position RC of subsequent future.

Figure 4:
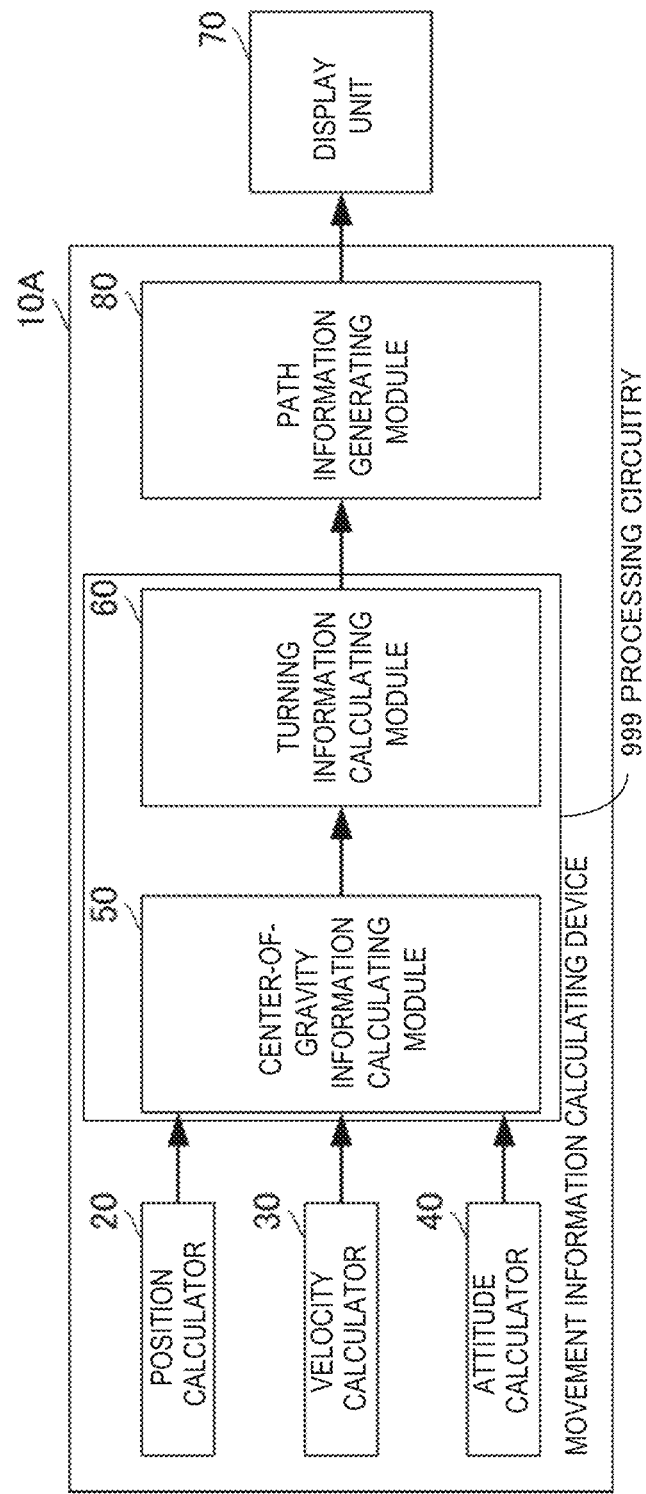
FIG. 4 is a functional block diagram of a movement information calculating device according to Embodiment 2 of the present disclosure.
Figure 5:
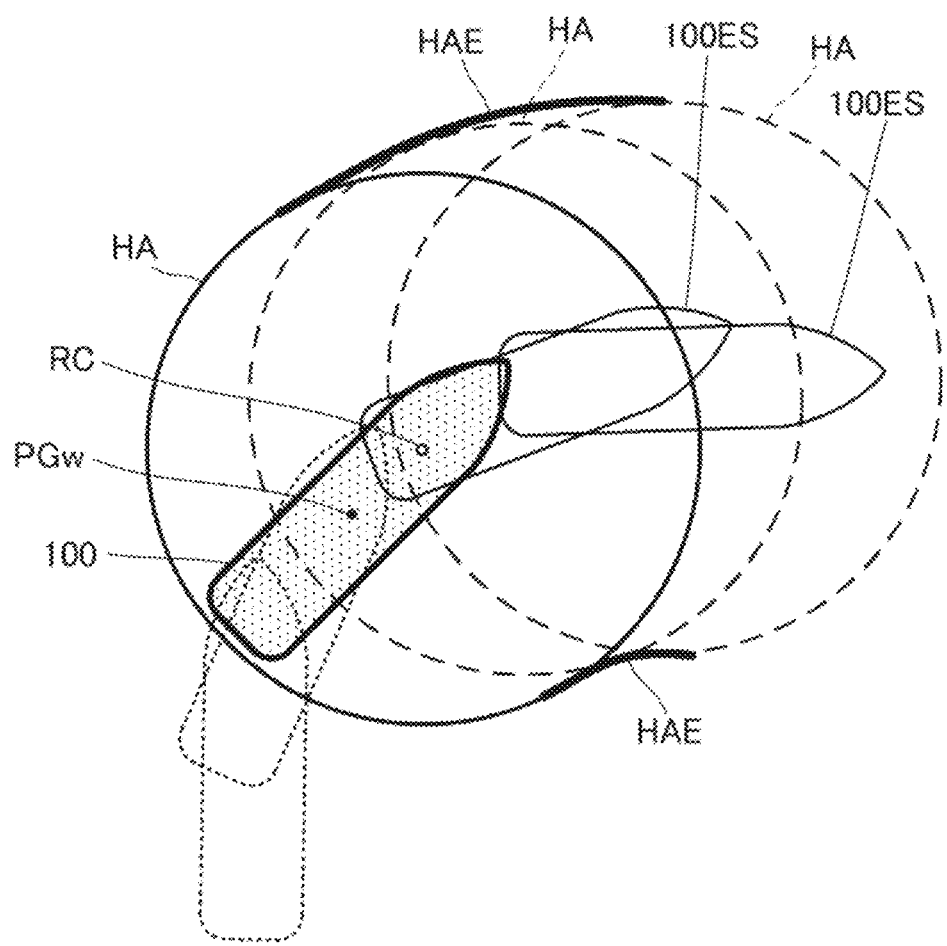
FIG. 5 is a view illustrating a first example of a display image according to Embodiment 2 of the present disclosure.
Figure 6:
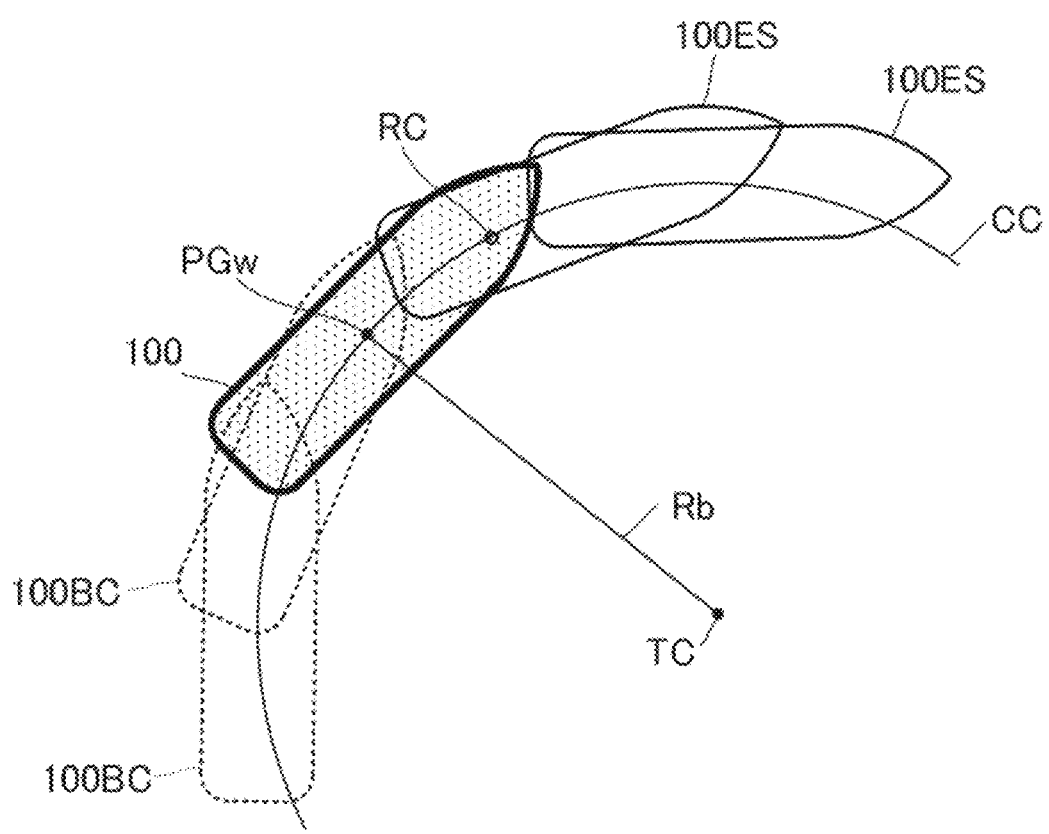
FIG. 6 is a view illustrating a second example of a display image according to Embodiment 2 of the present disclosure.

Next, a movement information calculating device according to Embodiment 2 of the present disclosure is described with reference to the drawings. FIG. 4 is a functional block diagram of the movement information calculating device according to Embodiment 2 of the present disclosure. FIG. 5 is a view illustrating a first example of a display image according to Embodiment 2 of the present disclosure. FIG. 6 is a view illustrating a second example of a display image according to Embodiment 2 of the present disclosure.

As illustrated in FIG. 4, the movement information calculating device 10A according to Embodiment 2 is different from the movement information calculating device 10 according to Embodiment 1, in that a path information generating module 80 is added. The other configurations of the movement information calculating device 10A are similar to the movement information calculating device 10, and thus, the similar configurations are omitted.

The path information generating module 80 may receive an input of the pivoting position RC from the turning information calculating module 60. The path information generating module 80 may store a length of the hull 100 (hull length), and a width of the hull 100 (hull width).

The path information generating module 80 may calculate a hazardous area HA and an estimated hazardous area HAE, based on the pivoting position RC, the hull length, and the hull width. In detail, the path information generating module 80 may calculate a circle of which the center is at the pivoting position RC, and a radius is a distance between the pivoting position RC and one of the bow and the stern which is farther from the pivoting position RC (the stern when moving forward). The path information generating module 80 may set this circle as the hazardous area HA. At this time, the path information generating module 80 may be preferred to consider the hull width, and calculate the shape of the hazardous area HA as a rotating shape of the hull 100 with the width.

Moreover, the path information generating module 80 may calculate hazardous areas HA of a plurality of future time points based on the pivoting positions RC at these time points. The path information generating module 80 may calculate the estimated hazardous area HAE based on the hazardous areas HA at the plurality of time points. In detail, the path information generating module 80 may calculate a curve connecting the hazardous areas HA at the plurality of time points on the starboard side of the hull 100, and a curve connecting the hazardous areas HA at the plurality of time points on the port side of the hull 100. The path information generating module 80 may calculate an area between the curve on the starboard side and the curve on the port side as the estimated hazardous area HAE.

The path information generating module 80 may generate a display image as illustrated in FIG. 5, which includes the current center-of-gravity position PGw, the pivoting position RC, the hazardous areas HA, and the estimated hazardous area HAE of the hull 100, and output it to the display unit 70. At this time, as illustrated in FIG. 5, the path information generating module 80 may display, for example, a mark indicative of the hull 100, an estimated positional mark(s) 100ES of the hull 100. Moreover, the path information generating module 80 may display a past position of the hull 100.

According to such a display, an operator can easily grasp the information to be considered when turning the hull 100, such as the hazardous areas HA and the estimated hazardous area HAE at the time of turning.

Moreover, the path information generating module 80 may generate a display image as illustrated in FIG. 6. The path information generating module 80 may receive inputs of the pivoting position RC, the turning center position TC, and the turning radius vector Rb from the turning information calculating module 60. The path information generating module 80 may generate the display image as illustrated in FIG. 6, which includes the pivoting position RC, the turning center position TC, and the turning radius vector Rb, and output it to the display unit 70. At this time, the path information generating module 80 may calculate a clearance circle CC which is estimated based on the turning center position TC and the turning radius vector Rb, and include it in the display image as illustrated in FIG. 6. Moreover, the path information generating module 80 may display, as illustrated in FIG. 6, the estimated positional mark(s) 100ES of the hull 100, and a hull positional mark(s) 100BC in the past.

According to such a display, the operator can easily grasp the information to be considered when turning.

Note that the velocity may be calculated based on the temporal change in the position acquired by the positioning sensor. In this case, the velocity sensor may be omitted. Furthermore, in this case, the function of the velocity calculator may be substituted by the positioning sensor or the center-of-gravity information calculating module 50.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise noted, numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A movement information determining device, comprising:
    a positioning sensor configured to determine a position of the positioning sensor on a movable body of the movement information determining device;
    a velocity sensor configured to determine a velocity of the movable body;
    an attitude sensor configured to determine an attitude of the movable body; and
    processing circuitry configured to:
    determine a center-of-gravity position and a center-of-gravity velocity of the movable body by using the position of the positioning sensor, the velocity, and the attitude; and
    determine one of a turning center position or a pivoting position of the movable body by using the center-of-gravity position and the center-of-gravity velocity,
    wherein the position of the positioning sensor is indicated in a geodetic coordinate system, the velocity is indicated in a north-east-down (NED) coordinate system, and the attitude is indicated in a movable body coordinate system, and
    wherein the processing circuitry is further configured to:
        determine a first coordinate transformation matrix b) using the attitude to transform a coordinate between the movable body coordinate system and the NED coordinate system, determine a second coordinate transformation matrix by using the position of the positioning sensor to transform a coordinate between the NED coordinate system and the movable body coordinate system, determine the center-of-gravity position and the center-of-gravity velocity by using the first coordinate transformation matrix and the second coordinate transformation matrix, generate path information, the path information including:
- the one of the turning center position or the pivoting position,
- the position of the positioning sensor on the movable body, and
- at least one of a hazardous area and an estimated hazardous area, and output the path information to a display.

2. The movement information determining device of claim 1,
wherein the positioning sensor includes a plurality of positioning sensors, and
wherein the processing circuitry is further configured to;
determine vectors indicative of positions of the plurality of positioning sensors with respect to the center-of-gravity position by using positions measured by the plurality of positioning sensors and the attitude, and
determine the center-of-gravity position and the center-of-gravity velocity using the vectors.

3. The movement information calculating device of claim 1, wherein the hazardous area is determined based on:
size attributes of the movable body, and
the one of the turning center position or the pivoting position.

4. The movement information determining device of claim 1, wherein the hazardous area further comprises:
a circle of having a center point equal to the one of the turning center position or the pivoting position, and
a radius measured from the center point to a predetermined part of the movable body.

5. The movement information determining device of claim 1, wherein the path information further includes:
each of the hazardous area and the estimated future hazardous area, and
a curve connecting the hazardous area to the at least one estimated future hazardous area.

6. A movement information determining method performed by a device that includes a movable body, comprising:
determining a position of a positioning sensor on the movable body;
determining a velocity of the movable body;
determining an attitude of the movable body;
determining a center-of-gravity position and a center-of-gravity velocity of the movable body by using the position of the positioning sensor, the velocity, and the attitude; and
determining one of a turning center position or a pivoting position of the movable body by using the center-of-gravity position and the center-of-gravity velocity,
wherein the position of the positioning sensor is indicated in a geodetic coordinate system, the velocity is indicated in a north-east-down (NED) coordinate system, and the attitude is indicated in a movable body coordinate system, and
wherein the method further includes:
determining a first coordinate transformation matrix by using the attitude to transform a coordinate between the movable body coordinate system and the NED coordinate system,
determining a second coordinate transformation matrix by using the position of the positioning sensor to transform a coordinate between the NED coordinate system and the movable body coordinate system,
determining the center-of-gravity position and the center-of-gravity velocity by using the first coordinate transformation matrix and the second coordinate transformation matrix,
generating path information, the path information including:
- the one of the turning center position or the pivoting position,
- the position of the positioning sensor on the movable body, and
- at least one of a hazardous area and an estimated hazardous area, and outputting the path information to a display.

7. A non-transitory computer-readable recording medium storing a control program causing a processor of a movement information determining device to execute processing, the processor configured to control operation of the movement information determining device, the processing comprising:
determining a position of a positioning sensor on a movable body of the movement information determining device;
determining a velocity of the movable body;
determining an attitude of the movable body;
determining a center-of-gravity position and a center-of-gravity velocity of the movable body by using the position of the positioning sensor, the velocity, and the attitude; and
determining one of a turning center position or a pivoting position of the movable body by using the center-of-gravity position and the center-of-gravity velocity,
wherein the position of the positioning sensor is indicated in a geodetic coordinate system, the velocity is indicated in a north-east-down (NED) coordinate system, and the attitude is indicated in a movable body coordinate system, and
wherein the method further includes:
determining a first coordinate transformation matrix by using the attitude to transform a coordinate between the movable body coordinate system and the NED coordinate system,
determining a second coordinate transformation matrix by using the position of the positioning sensor to transform a coordinate between the NED coordinate system and the movable body coordinate system,
determining the center-of-gravity position and the center-of-gravity velocity by using the first coordinate transformation matrix and the second coordinate transformation matrix,
generating path information, the path information including:
- the one of the turning center position or the pivoting position,
- the position of the positioning sensor on the movable body, and
- at least one of a hazardous area and an estimated hazardous area, and outputting the path information to a display.

* * * * *